June 28, 1927.
B. M. LEECE
1,633,671
GENERATOR REGULATION
Filed Dec. 10, 1925
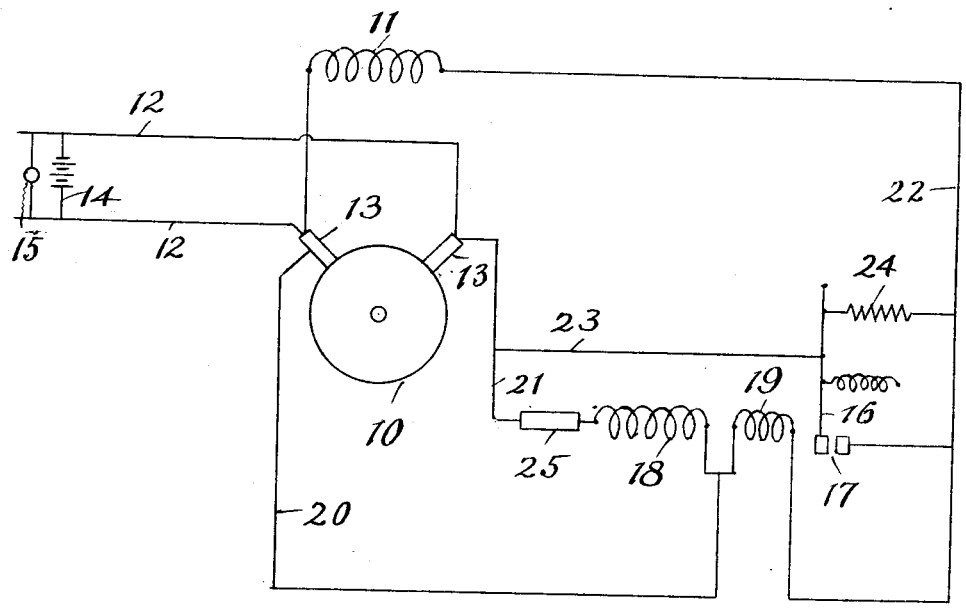
Inventor,
Bennett M. Leece
Kwis Hudson & Kent
Attys.

Patented June 28, 1927.

1,633,671

UNITED STATES PATENT OFFICE.

BENNETT M. LEECE, OF CLEVELAND, OHIO, ASSIGNOR TO THE LEECE-NEVILLE COMPANY, OF CLEVELAND, OHIO, A CORPORATION OF OHIO.

GENERATOR REGULATION.

Application filed December 10, 1925. Serial No. 74,456.

This invention relates to regulators, particularly voltage regulators for generators such as are employed in starting and lighting systems. The invention is especially useful when employed on certain types of vehicles, as for example, aeroplanes which desirably employ a comparatively small battery, though the invention has utility in other fields or on other types of vehicles.

It is very desirable with generating systems adapted for certain uses, that the voltage be regulated very closely during normal operation, and that the battery be recharged immediately after starting at a higher rate than during normal operation, particularly when a relatively small battery is employed which may be substantially discharged in starting the engine.

It is the chief object of the present invention to provide a system which meets these requirements, the objects or results being attained in this instance, by certain improvements in, or in connection with the voltage regulator which allows initially a comparatively high voltage so as to obtain a high charging rate for a short time, and then reduces the voltage to normal so that the battery will be charged at the lower rate, the voltage then remaining substantially constant.

In carrying out my invention I employ in association with the regulator a device which controls the current passing through the regulator coil which determines the rate of vibration of the regulator armature, as by placing in series with the said coil a device having a decided negative temperature coefficient so that initially it retards the flow of current through the coil, but as it warms up its resistance decreases, allowing a gradually increased flow of current through the coil so as to permit a gradually increasing rate of vibration and thereby reduce the voltage of the generator to its normal value, which will be maintained with very slight variations.

The invention may be further briefly summarized as consisting in certain novel combinations and arrangements of parts which will be described in the specification and set forth in the appended claims.

The single figure of the drawing shows conventionally or diagrammatically, a generating system for vehicles embodying my invention in its preferred form.

In the drawings 10 represents the generator armature and 11 the field winding, a generator of the shunt type being herein illustrated. The load circuit is indicated by the conductors 12 which are connected to the brushes 13. The load may include in addition to the battery 14, lamps indicated at 15, and other current consuming devices such as the ignition apparatus for the engine which propels the vehicle and drives the generator.

The voltage regulator may have a single coil, or two coils, a two-coil regulator such as covered by my prior Patent No. 1,540,698 being herein illustrated, as I find that the present invention gives very good results when employed in connection with a two-coil regulator such as covered by my patent. This regulator includes a vibrating armature 16, contacts 17 and two coils including a main coil 18 and an auxiliary coil 19, the main coil 18 being connected by conductors 20 and 21 across the terminals or brushes 13 of the generator, so that the current through this coil will vary with slight changes in the voltage of the generator and therefore determine the rate of vibration of the armature 16. The auxiliary coil 19 has one terminal connected to the conductor 20 and therefore to one terminal of coil 18, and its other terminal is connected to a conductor 22 which is in the circuit of the field winding 11, one of the contacts 17 being likewise connected to this conductor. Armature 16 is also connected to the conductor 21 by the conductor 23, and in this instance there is a resistance 24 across the contacts, and as shown, extending around the contacts between the armature and conductor 22.

It will be noted that the circuit of the main regulator coil 18 is unaltered by the opening and closing of the contacts, but the circuit of the auxiliary regulator coil 19 is altered thereby, the effect being that the changes in the field flux by the rapidly interrupted or varying current passing through the coil 19 vibrates the armature, but its rate of vibration is determined by the current passing through coil 18, and therefore by the voltage of the generator impressed on the coil.

As stated above, after the engine is started by current supplied by the battery, the energy of the battery may be so dissipated as to make it desirable that for a brief time it be charged at a relatively high rate and subsequently at a lower rate, and as further pointed out above, I accomplish that result by the provision of means whereby when the engine is first started, the regulator coil, i. e. the coil which determines the rate of vibration of the regulator is initially traversed by a current smaller than normal, which current then gradually builds up so that the regulator will allow a comparatively high voltage at the start of its operation and a gradually reduced voltage until the normal voltage is reached.

While I have tried various ways of accomplishing this result, I find that it is accomplished most effectively by placing in series with the regulator coil, or the coil which determines the rate of vibration of the armature, in this instance the coil 18, a special resistance member 25 with a very decided negative temperature coefficient. I have found that a resistance material known as "Globar" gives very good results, though possibly other materials or compositions can be found by experiment, which will function in the desired manner and produce as good results.

This resistance member 25 with its negative temperature coefficient of course has a higher resistance when cold than when it is warmed by the current passing through it, so that it initially reduces the current passing through the coil 18. Consequently, when the generator is first started, since the pull on the armature caused by the field produced by the current passing through the coil 18 is less than normal, the period or interval that the contacts 17 remain closed and the resistance 24 cut out of the field circuit is greater than normal, so that there is an abnormally high generator field excitation, and therefore voltage at the terminals of the generator, but as the resistance member 25 warms up, its resistance decreases gradually, allowing more current to pass through the regulator coil 18, so that the rate of vibration of the armature is correspondingly increased. This decreases the field excitation of the generator so that the generator voltage is gradually reduced, and after a given time, which is determined by the characteristics of the resistance material 25, the regulator functions normally, keeping the voltage of the machine at substantially the desired value.

I have mentioned the fact that the invention finds special utility when applied to the generators employed on aeroplanes, but nevertheless it has utility also, but possibly to a less marked degree, on other motor driven vehicles such as road vehicles. Furthermore, I wish to repeat that I do not regard the invention as confined to the use of any particular negative temperature coefficient resistance material, nor to the particular way illustrated of carrying out the principle of the invention considered in its broadest aspects.

Having described my invention, I claim:

1. In a system of the character described, a generator, a regulator therefor comprising a vibratory member and a coil for vibrating the same, and means for causing the ampere turns of the regulator coil to be gradually increased for a time after the generator is started.

2. In a system of the character described, a generator, a regulator therefor comprising a vibratory member and a coil for vibrating the same, and thermal means for causing the current traversed by the regulator coil to be gradually increased for a time after the generator is started.

3. A generator comprising an armature and a field winding, a voltage regulator for varying the field excitation comprising a vibratory member and a coil normally responding to changes in the voltage of the generator, and a member connected in circuit with the regulator coil and having a negative temperature coefficient.

4. A generator for variable speed engine driven vehicles having a voltage regulator comprising a vibratory member, one or more coils for vibrating said member including a coil connected across the terminals of the generator so as to determine the rate of vibration thereof, and a resistance member having a negative temperature coefficient in series with said coil.

In testimony whereof, I hereunto affix my signature.

BENNETT M. LEECE.